United States Patent [19]

Pejcha

[11] 3,768,083

[45] Oct. 23, 1973

[54] BASEPLATE ASSEMBLY FOR A DISC DRIVE

[75] Inventor: Ivan Pejcha, Santa Clara, Calif.

[73] Assignee: Information Storage Systems, Inc., Cupertino, Calif.

[22] Filed: Aug. 10, 1972

[21] Appl. No.: 279,351

[52] U.S. Cl. .......................... 340/174.1 C, 346/137

[51] Int. Cl. .......................... G11b 1/00

[58] Field of Search .......................... 340/174.1 C; 346/137; 274/10, 39

[56] References Cited

UNITED STATES PATENTS

| | | | |
|---|---|---|---|
| 3,576,454 | 4/1971 | Beech, Jr. | 340/174.1 C |
| 3,643,242 | 2/1972 | Bryer | 340/174.1 C |
| 3,699,555 | 12/1972 | Du Vall | 340/174.1 C |
| 3,484,760 | 12/1969 | Perkins et al. | 340/174.1 C |
| 3,587,075 | 6/1971 | Brown | 340/174.1 C |

*Primary Examiner*—Vincent P. Canney
*Attorney*—Gerlad L. Moore

[57] ABSTRACT

This invention relates particularly to direct access data storage devices, and more particularly, to a disc drive wherein data is recorded on a rotating disc by means of a read/write head moveable to precise data track positions located on the disc surface. For accurate positioning of the head relative to the disc, the head support mechanism and the disc are supported on a baseplate assembly of a special design.

8 Claims, 3 Drawing Figures

BASEPLATE ASSEMBLY FOR A DISC DRIVE

BACKGROUND OF THE INVENTION

1. Field of the Invention

This invention primarily relates to a disc storage drive wherein a read/write head is moved across the surface of a rotating disc for reading and recording data in digital form and at precise locations.

2. Description of the Prior Art

Direct access storage devices of the type that employ a rotating disc or a plurality or stack of rotating discs as a storage media, commonly known as disc drives, are widely used in the computer industry. In such devices, one or more discs are mounted for rotation about a fixed axis in proximity to an access mechanism which carries an array of read/write heads on a supporting mechanism. The access mechanism includes a linear motor mounted on an extension of a radius of the recording discs to facilitate movement of the read/write heads radially of the disc surfaces.

In such a mechanism, it is desirable to support the read/write heads in a manner that insures they will trace the identical path in each access movement so that the heads may be positioned and repositioned with a high degree of accuracy. At the same time, it is important to keep the mass of the moveable parts to a minimum to permit a maximum rate of acceleration and deceleration thereby reducing the access time.

Requirements for repetition of positioning of the read/write heads by the positioning servo become particularly acute in disc drives with removable and interchangeable discs or plurality of discs in a pack. With the discs being interchangeable between drives, the access mechanism of each device must support the read/-write heads for precision linear movement relative to the discs so that data written on one device can be read or revised on another drive without difficulty. Additionally, the requirements of head positioning are greater as the density of the lines of data is increased, thereby requiring that the heads be positioned at each line within closer tolerances.

The problems of positioning are further complicated in that the electromagnetic actuator used to move the heads and head support mechanism, as well as the disc or disc pack and support assembly, both weight 40 pounds or more. To support these structures in a rigid manner relative to each other, a substructure commonly called a baseplate is utilized. The baseplate used previously has been quite heavy and complicated in design to provide sufficient rigidity for fixing the position of the head assembly relative to the pack, thereby adding considerably to the cost of the apparatus. To further fix the relative positions of the heads and the pack, both the electromagnetic actuator and the disc pack were rigidly fixed to a single baseplate, thereby resulting in the transmission of vibrations from both to the baseplate such that the plate tended to resonate as a result of either or both the moving actuator and the rotating disc. The problems of instability of the servosystem used to position the heads on the disc were increased by the use of this structure.

To minimize the resonance effect, such extreme measures have had to be employed as actually "tuning" the baseplate by changing the stiffness thereof to limit vibration. Experience has shown that in production, due to relatively small differences in size or fit, and with usage and the resulting wear or loosening of parts, the assembly thereafter often becomes "detuned" resulting in the instability of the positioning servosystem. The object of the subject invention is to minimize the heretofore described problems by providing an improved baseplate and accessing mechanism for a disc drive.

SUMMARY OF THE INVENTION

The present invention comprises a baseplate assembly for a disc drive utilizing a stiff inner baseplate section having means for uspporting the recording disc and the head supporting assembly, in combination with an outer baseplate section fixed in position relative to an inner baseplate by vibration damping means and having means for moving the head supporting assembly, whereby the position servo loop for the heads comprises only the stiff inner baseplate section, the rotating disc and the head supporting apparatus so as to minimize vibration resonance and flexing within the servo loop, thereby increasing the precision and speed with which the heads can be positioned.

DESCRIPTION OF THE PREFERRED EMBODIMENT

Figure 1:
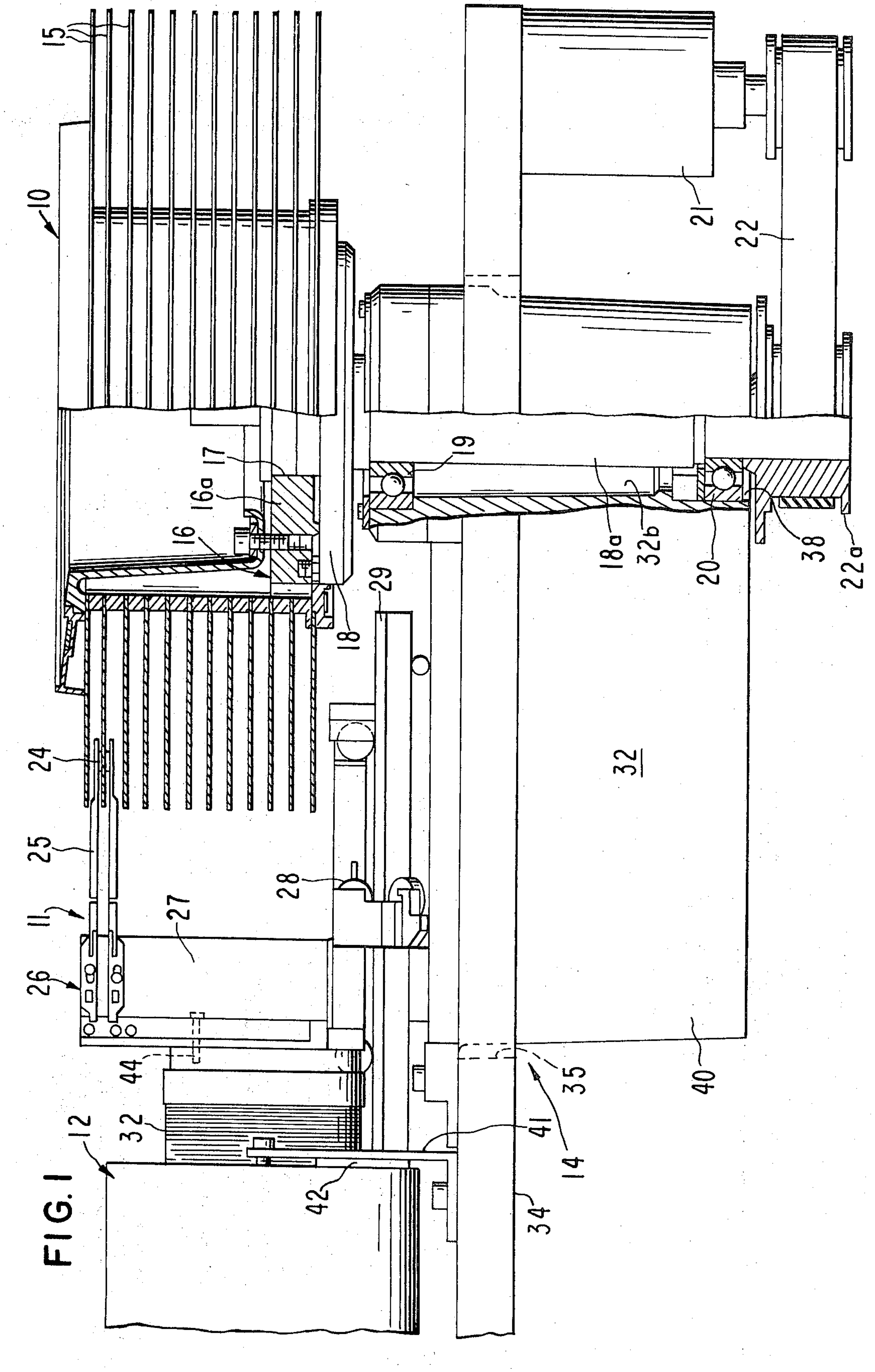
FIG. 1 is a side view, partially in cross section, of a portion of a disc drive apparatus incorporating the subject invention.
Figure 2:
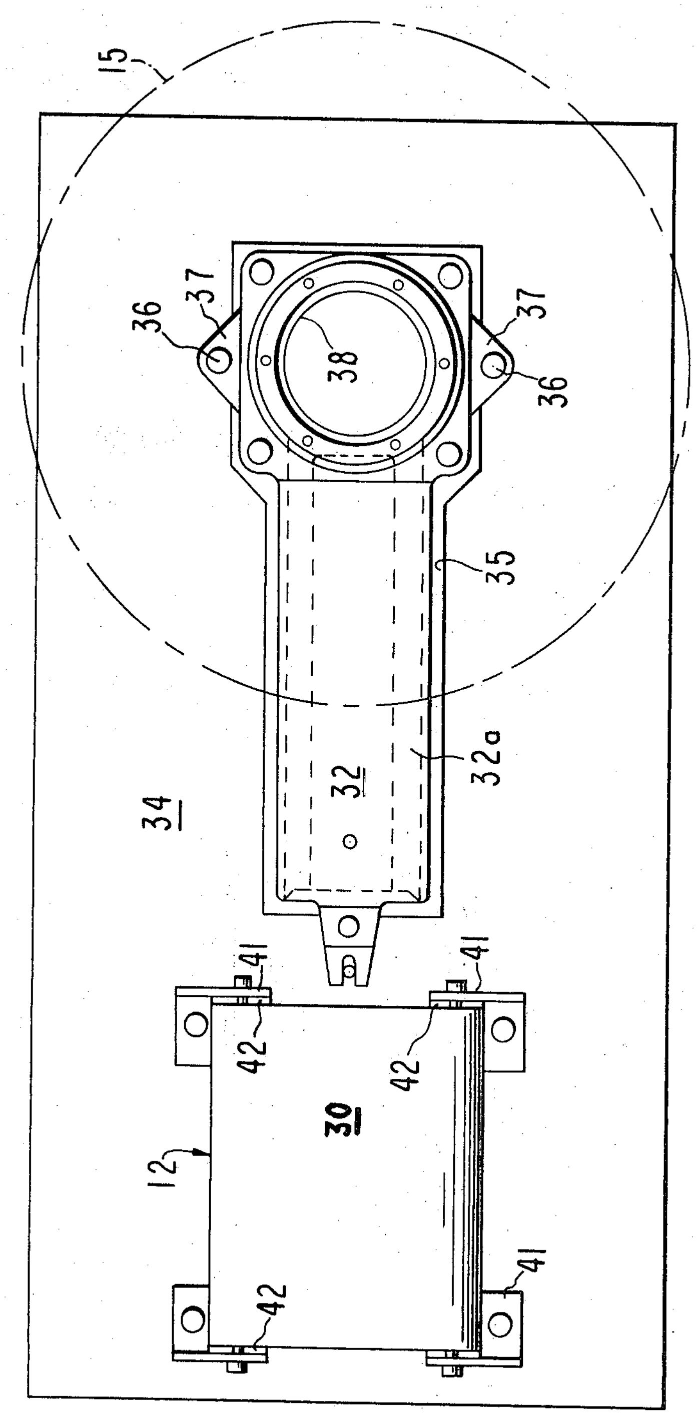
FIG. 2 is a top plan view of the baseplate and linear motor shown in FIG. 1.
Figure 3:
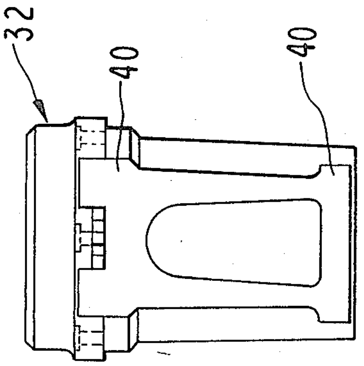
FIG. 3 is an end view of the inner baseplate.

In the drawings are shown some of the major components of a disc drive used to read and record data on a disc pack 10 and including a rea/write head assembly 11 and a linear motor 12 mounted on a baseplate assembly 14 for the purpose of reading and writing the information in digital form. The disc pack 10 serves as a memory device and comprises a plurality of discs 15 having on the upper and lower surfaces thereof a magnetic material (not shown) on which data can be recorded magnetically. The discs are mounted in a support 16 having an opening 17 in a lower plate **16*a* into which a spindle shaft 18 extends. The spindle shaft, lower plate and disc pack include abutting machined surfaces such that when mounted on the shaft, the disc pack is precisely positioned relative to the baseplate assembly 14. The spindle shaft is supported by bearings 19 and 20 fixed to the baseplate so as to permit rotation of the spindle shaft and the associated disc pack. A motor 21 rotates the spindle shaft and therefore the disc pack through a drive means including a drive belt 22 and pulley 22*a*** in the shaft.

For reading and writing information on the disc pack surfaces, a read/write head 24 is supported in close proximity to the associated disc magnetic surface by an arm 25. The arms are held by a support assembly 26 comprising a T-block 27 mounted on a carriage provided with a plurality of rollers 28 for movement along a rail 29 fixed to the baseplate. Linear movement of the support assembly 26 shifts the heads in a direction radially of the disc surfaces. By proper energization of the read/write heads, information in digital form can be transferred to and from the disc surfaces, as the disc pack is rotated and thereby moved past the head, to effect the writing and reading of data in concentric circular locations on the discs. A more complete explanation of such an apparatus can be obtained by referral to U.

S. Pat. No. 3,587,075, issued on June 22, 1971, and having as inventors Stanley Brown, et al.

To effect movement of the support assembly 26 along the rail 29, the electromagnetic linear motor 12 is used which includes an outer pole piece 30 fixed in stationary position for magnetic interaction with a movable coil 32 attached to the T-block 27 of the support assembly 26. By proper energization of the coil in the usual manner (not shown), magnetic interaction between the stationary pole piece 30 and the coil will cause the support assembly to move parallel to the extending rail 29 and in a direction lateral to the axis of rotation of the disc pack 10. Thus, by moving the support assembly in a direction towards and away from the axis of rotation of the disc pack, the heads are positioned adjacent the concentric circles corresponding to the paths along which data is recorded. A more detailed description of a head support apparatus can be obtained by referral to U.S. Pat. No. 3,531,788, Apparatus for Loading and Unloading a Slider Assembly, issued on Sept. 29, 1970, and having as inventors S. F. Brown, et al. A head positioning apparatus for use with such a mechanism is described in U. S. Pat. No. 3,631,443, Unsafe Velocity Detection System, issued on Dec. 28, 1971, and having the inventors M. Halfhill, et al.

In accordance with the present invention, the baseplate assembly is divided into two sections, a first or inner baseplate section 32 and a second or outer baseplate section 34 in fixed position relative to each other but substantially mechanically isolated. By locating the disc pack and disc pack support, the head support means and heads on the stiff inner baseplate section, the mechanical servo loop for head positioning is shortened and stiffened in a manner to greatly increase the positioning speed and the precision with which the heads can be located relative to the disc surfaces.

In the example shown, the inner baseplate 32 interfits in an opening 35 within an outer baseplate section 34. The inner baseplate is fixed in position by three mounting screws 36 which extend through three mounting flanges 37 projecting from the edge of the inner baseplate section and overlapping the outer baseplate section. The inner baseplate section includes means for holding the pack support means which includes the spindle shaft 18 mounted on the bearings 19 and 20. The lower spindle shaft section **18*a* extends through an opening 38 in the inner baseplate section such that the pulley 22*a* can be fixed thereon for mounting of the drive belt 22. Also fixed to the elongated section 32*a* of the inner baseplate is the rail 29 on which the carriage 28** rides for movement of the head support means relative to the disc.

Thus, it can be seen that those components comprising the mechanical servo loop for positioning the heads relative to the discs are all mounted on the inner baseplate section. Naturally it is important for this mechanical loop to be as rigid as possible to enhance the speed and the precision with which the positioning servo loop operates. For this purpose the inner baseplate section is made very rigid by the addition of the stiffening members 40 extending lengthwise to the underside of the elongated section **32*a* and fixed at one end to a spindle shaft well 32*b* supporting the spindle shaft 18 through the bearings 19 and 20**. The stiffening members and the well serve to form a beam construction for the inner baseplate section for holding within close tolerances the relative positions of the disc pack, the head support means and the head position sensing means.

However, as mentioned heretofore, the addition of a very stiff baseplate can add the complicating factor of serving to transmit vibrations between the disc pack assembly and the linear motor assembly. To relieve this problem, the linear motor is bolted to the outer baseplate section by mounting legs 41 which provide a flexible connection serving as vibration damping means between the stationary pole 30 and the outer baseplate 34. The coil 32 is fixed to the T-block 27 by bolts 44 such that energization of the coil causes movement of the head support means. Rubber pads 42 are provided between the legs and the linear motor to damp any low frequency vibration resulting from energization of the linear motor. Additionally the disc pack drive motor 21 is mounted to the bottom of the outer baseplate section to further isolate any vibratory motion from the inner baseplate section.

By separation of the inner and outer baseplate sections and isolation of the linear motor and disc drive motor from the mechanical servo structure, the main vibration sources are somewhat isolated from the head positioning structure and mechanical vibration and resonance are reduced thereby making the positioning servo more effective in operation. The mounting flanges 37 that serve to support the inner baseplate on the outer baseplate are constructed to damp to a great extent in those frequency ranges most commonly existing in the apparatus the transmission of vibratory forces between the baseplate sections. Additionally the mounting of the linear motor pole piece 30 on the vibration damping legs 41 further serves to limit the transmission of vibratory forces to the mechanical servo loop.

I claim:

1. In a data storage apparatus for transferring data to or from a memory device by the interaction between a read/write head and the memory device, a stiff first baseplate section, means for supporting said memory device on the first baseplate section, head support means on said first baseplate section for supporting the head adjacent the memory device, a second baseplate section fixed in position relative to the first baseplate section in a manner to limit the transmisison of vibratory forces between the baseplate sections, and means connected to the memory device for moving the device past the head, whereby said first baseplate section, head support means and memory device support means together comprise a mechanical servo loop for positioning the heads relative to the memory device, which loop is mechanically isolated from the second baseplate section.

2. A data storage apparatus as defined in claim 1 wherein said means for moving the memory device is supported on the second baseplate section.

3. A data storage apparatus as defined in claim 1 wherein means for moving said head support means is mounted on said second baseplate section.

4. A data storage apparatus as defined in claim 1 wherein said second baseplate section includes an opening therein and said first baseplate section is positioned within said opening.

5. A data storage apparatus as defined in claim 3 including vibration damping means fixed to said second baseplate section for supporting said means for moving said head support means.

6. A data storage apparatus as defined in claim 3 wherein said memory device includes a rotatable disc on which data can be recorded.

7. A data storage apparatus as defined in claim 1 wherein said second baseplate section is fixed in position relative to said first baseplate section by means serving to damp the transmission of vibratory forces between the sections in those frequency ranges most commonly existing in the apparatus and caused inpart by the memory device moving means.

8. A data storage apparatus as defined in claim 4 wherein said second baseplate section is fixed in position relative to said first baseplate section by means serving to damp the transmission of vibratory forces between the sections in those frequency ranges most commonly existing in the apparatus and caused in part by the memory device moving means.

* * * * *